United States Patent [19]

Mann

[11] Patent Number: 4,498,919
[45] Date of Patent: Feb. 12, 1985

[54] METHOD FOR MAKING COLORED PHOTOCHROMIC PRESCRIPTION OPHTHALMIC LENSES

[75] Inventor: George H. Mann, Corning, N.Y.

[73] Assignee: Corning Glass Works, Corning, N.Y.

[21] Appl. No.: 547,108

[22] Filed: Oct. 31, 1983

[51] Int. Cl.³ .................... C03C 3/26; C03C 21/00
[52] U.S. Cl. .................... 65/30.11; 65/30.14; 65/32; 65/37; 350/354; 501/13
[58] Field of Search .................... 65/30.11, 37, 55, 32, 65/30.14; 501/13; 156/290, 297, 285, 275.7, 275.3; 350/354; 351/162, 163, 177

[56] References Cited

U.S. PATENT DOCUMENTS

| | | | |
|---|---|---|---|
| 990,303 | 4/1911 | Shreiner | 351/163 X |
| 2,382,660 | 8/1945 | Penberthy | 65/37 X |
| 2,675,740 | 4/1954 | Barkley | 65/30.11 X |
| 3,653,750 | 4/1972 | Marx et al. | 65/37 X |
| 3,656,923 | 4/1972 | Garfinkel et al. | 65/37 X |
| 4,170,567 | 10/1979 | Chu et al. | 350/354 |
| 4,261,656 | 4/1981 | Wu | 351/163 |
| 4,268,134 | 5/1981 | Gulati et al. | 351/163 |
| 4,284,686 | 8/1981 | Wedding | 65/30.11 X |
| 4,422,893 | 12/1983 | Duchateau et al. | 156/285 X |

*Primary Examiner*—Kenneth M. Schor
*Attorney, Agent, or Firm*—K. van der Sterre

[57] ABSTRACT

Colored photochromic ophthalmic lenses are produced by combining a photochromic cap element having an integrally colored back surface with an ophthalmic crown base element having a prescription-ground back surface, the cap back and base element front surfaces having been finished to a matching standard base curvature, thus providing a cemented assembly exhibiting a selected combination of prescribed vision-correcting and light filtering properties.

4 Claims, 1 Drawing Figure

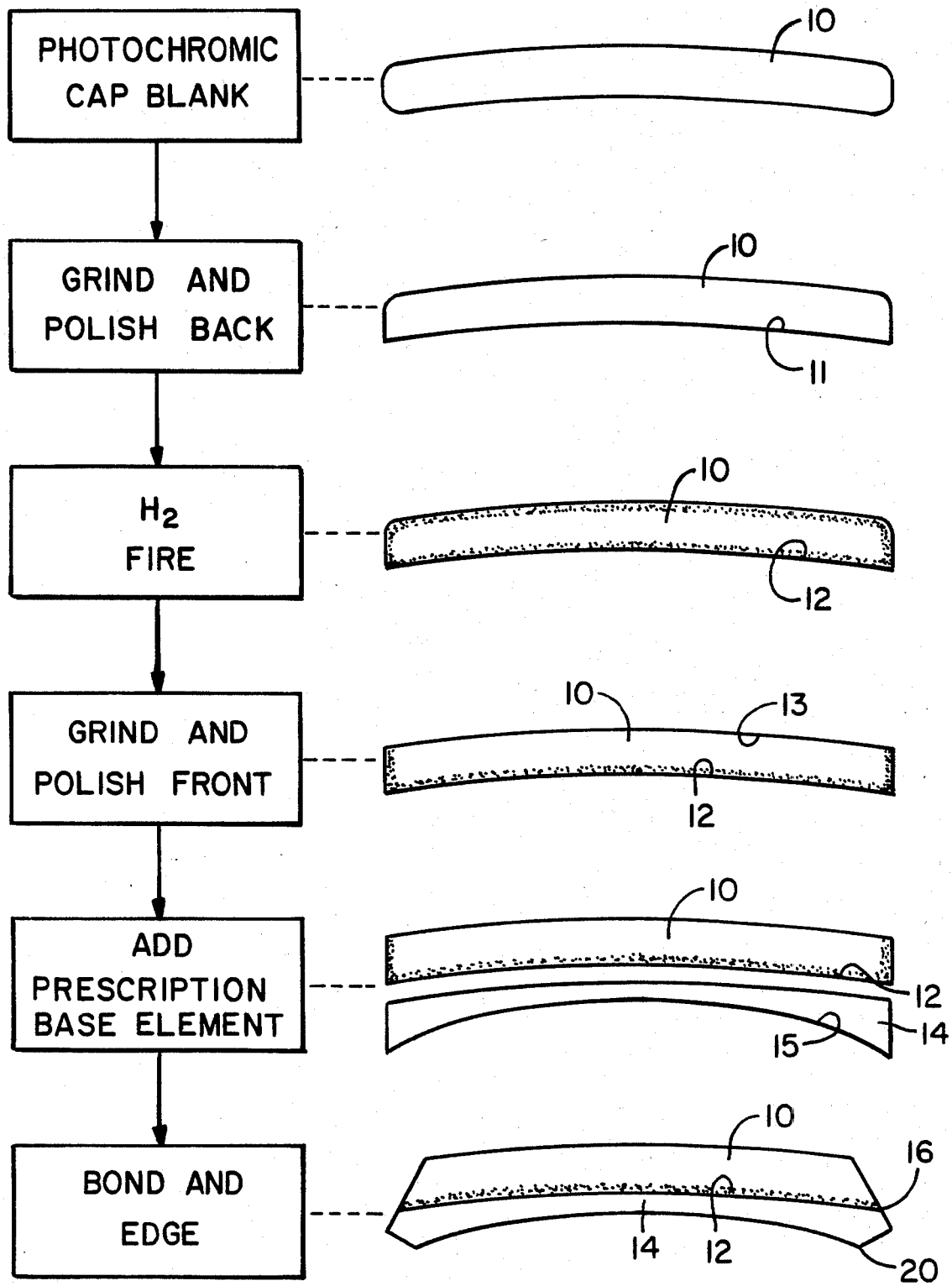

METHOD FOR MAKING COLORED PHOTOCHROMIC PRESCRIPTION OPHTHALMIC LENSES

BACKGROUND OF THE INVENTION

1. Field of the Invention

The present invention is in the field of prescription ophthalmic lenses and particularly relates to a method for making colored or tinted photochromic prescription lenses having prescribed combinations of light-filtering and light-refracting properties.

2. Description of the Prior Art

The use of photochromic glass for brightness-compensating sunglasses and prescription ophthalmic lenses is well known. Photochromic glasses, which are glasses containing silver halide crystallites which reversibly darken on exposure to light and fade upon removal of the light, were first described in U.S. Pat. No. 3,208,860. A number of more advanced photochromic glasses have since been developed and described in the patent literature, including U.S. Pat. No. 4,190,451 which describes some fast-fading photochromic glasses exhibiting desirably low interdependence between photochromic darkening and glass temperature.

The adjustment of the undarkened transmittance of photochromic glasses by tinting, for cosmetic purposes, eyewear comfort and for medical reasons, has also been of interest. German utility model Gm No. 1,985,755 describes configurations for laminated photochromic ophthalmic lenses wherein photochromic glass lens elements are cemented to tinted glass or thin film/glass backing elements to introduce fixed tints to prescription or non-prescription lenses. It is also known to introduce colorants such as $NiO$, $Cr_2O_3$, $CuO$, $V_2O_5$, $MnO$, $Pr_2O_3$, and $Er_2O_3$ into photochromic glasses to modify the undarkened transmittance thereof.

Following the development of photochromic glasses it was reported that colored surface layers could be developed in silver-halide containing glasses by heat treating the glasses under reducing conditions. Hence U.S. Pat. Nos. 3,892,582 and 3,920,463 disclose the production of photochromic glasses exhibiting yellow colors, while U.S. Pat. Nos. 4,240,836, 4,284,686, and 4,290,794 disclose further heat treatment methods for generating other surface colors in silver-halide-containing photochromic glasses.

Adding a coloring heat treatment to the existing commerical process for producing prescription photochromic ophthalmic lenses has a significant complicating effect on the process, particularly since the process already involves multiple steps which have to be performed in a specific sequence. Hence, in addition to the heat treatment required to develop photochromic properties in the lens blanks and the heat treatment required to develop coloration in the lenses, the further steps of prescription grinding of the lenses, chemical or thermal strengthening of the lenses to meet U.S. Food and Drug Administration strength requirements, and edging of the lenses for framing are required.

The latter three steps of the above-described process are conveniently carried out in small optical laboratories close to the point of lens purchase. However, the coloring operation requires careful process control in order to provide reproducible tints (lenses of the same nominal tint must be sufficiently close in color to be interchangeable), and is best carried out on a large scale under factory conditions, preferably as an adjunct to the lens manufacturing process.

Unfortunately, the coloring process can only be applied to finished lens surfaces, since the grinding and polishing of a tinted surface will remove or modify the color in an uncontrollable way. Further, in many cases the color should be present only on the back or prescription ground portion of the lens in order to avoid undue light absorption by the front surface, with its attendant loss of photochromic response characteristics. In commercial practice this has necessitated the return of finished or semifinished lenses from the optical laboratory to the lens manufacturer for coloring, causing undue delays in the filling of ophthalmic prescriptions.

It is therefore a principal object of the present invention to provide an alternative and improved process for the manufacture of colored photochromic ophthalmic lenses which provides a reproducible product of high quality more quickly and at reduced expense.

Other objects and advantages of the invention will become apparent from the following description thereof.

SUMMARY OF THE INVENTION

The present invention provides a method of making a colored prescription photochromic ophthalmic lens wherein the photochromic and prescribed tinting properties are imparted to the lens by a relatively thin glass lens cap element. Thus the finished lens is a composite lens consisting of a cemented assembly which includes the lens cap element and a lens base element. The cap element is a glass photochromic element which incorporates an integral colored surface layer and the base element is a glass element imparting vision-corrective power to the lens assembly.

To fabricate a lens in accordance with the invention, a blank for the cap, referred to as a photochromic glass cap blank and exhibiting the photochromic properties desired in the finished lens, is first provided, and the back surface of the blank, which is to be a concave surface, is ground and polished to a finished surface having a commonly prescribed standard base curve. Standard base curves in the range of about 2-10 diopters are commercially available, with the most commonly dispersed base curves being 4.25, 6.18, and 8.18 diopters.

After the back surface of the cap has been finished to the specified base curve, the semifinished cap blank is subjected to a heat treatment in a reducing atmosphere to develop a colored surface layer thereon. Typically this treatment results in the coloration of all surfaces of the blank, but only the coloration of the back surface is absolutely necessary.

After the cap blank is colored as above described, it is in most cases further finished by grinding and polishing the front surface of the cap. This step removes any color present on the front surface of the cap, reduces the cap thickness to a value not exceeding about 1.5 mm, and provides a front surface curvature matching that of the back surface or base curve of the cap, so that the finished cap exhibits no refractive power.

The base element of the lens, which is to be cemented to the cap element to provide the finished product, is composed of a conventional ophthalmic crown glass and, as provided for use, is finished to a convex front surface curvature matching the standard base curve to which the cap element has been finished. The back surface of the base element, which is also finished as provided, is ground and polished to a selected vision-corrective prescription which may include power, cylinder, multifocal and prism correction.

The finished colored prescription product is produced by cementing the cap element to the base element, the back surface of the cap being cemented to the front surface of a base element which is of matching base curvature. Conventional grinding and polishing equipment is capable of reproducibly providing base curvatures within ±0.05 diopters of a target value. This is sufficiently precise in curvature that only a very thin layer of a suitable cement is needed to permanently bond lens elements of the same nominal base curvature into a unitary lens. The bonded lens can thus be subjected to edging and framing operations without an undue risk of breakage or delamination.

BRIEF DESCRIPTION OF THE DRAWING

The invention may be further understood by reference to the drawing which is a diagram schematically illustrating a representative procedure for fabricating a colored prescription photochromic ophthalmic lens in accordance with the invention.

DETAILED DESCRIPTION

The composition of the photochromic glass used to form the blank for the lens cap is not critical; any of the well known silver-halide-based photochromic glasses, which are glasses wherein the photochromic response is due to the presence of a multiplicity of reversibly darkenable silver halide crystallites, may be used. Most frequently, as in the aforementioned patents relating to colored photochromic glasses, the glass is an alkali boroaluminosilicate glass containing AgCl, AgBr and/or AgI as the photochromic constituents. The glass may additionally contain optional constituents including the following: oxide glass modifiers such as the alkaline earth oxides, PbO, ZnO, $La_2O_3$, $TiO_2$, and $ZrO_2$, transition metal colorants such as NiO, CoO, $Cr_2O_3$, MnO, and $V_2O_5$, which impart bulk color to the glass, rare earth colorants such as $Pr_2O_3$ and $Er_2O_3$, noble metal colorants such as Pd and Au, optional halogens such as F, and other known glass constituents in minor amounts. The glass need not be refractive index-corrected to the ophthalmic industry standard value of 1.5230, since it will be finished to a so-called plano (zero refractive power) configuration to avoid any effect on the refractive power of the finished lens.

The cap blank may be formed by any conventional forming process, such as pressing, and is thereafter heat treated in the known fashion to develop photochromic properties therein. This heat treatment step, which is employed to precipitate the light-sensitive photochromic crystallites in the glass, does not normally result in the development of significant bulk or surface color in the glass. The cap blank is preferably formed in the rough configuration of a meniscus lens, which is the configuration to be provided in the finished cap element, to avoid the need to remove excessive quantities of glass during subsequent grinding and polishing steps.

The grinding and polishing of the back or concave surface of the cap blank thus provided is carried out to generate a finished surface of optical quality and with a spherical curve matching one of the standard base curves used in the ophthalmic industry. As previously noted, standard base curves in the range of about 2 to 10 diopters are readily available commercially, but the majority of prescriptions utilize base curvatures in the middle of this range. Presently, the most commonly available base curves are 4.25, 6.18 and 8.18 diopters.

The coloring of the finished back surface of the cap typically involves subjecting the entire semifinished blank to a reducing atmosphere at elevated temperatures which may range from about 200° C. to temperatures as high as 50° C. above the annealing point of the glass. The usual temperature range of treatment for glasses such as described in the aforementioned patents is 200°–530° C. Times of treatment may range from minutes to days, but are commonly in the range of about ¼–72 hours. Examples of reducing atmospheres which may be employed include pure hydrogen, forming gas (typically containing 95% $N_2$ and 5% $H_2$ by volume), carbon monoxide, and cracked ammonia, which can include varying proportions of $H_2$ and $N_2$.

In commerical practice, the reduction heat treatment will normally be carried out on a relatively large scale in a batch or continuous process, and no attempt will be made to shield portions of the semifinished cap blanks from the effects of the treatment. Thus all surfaces of the blanks including the front surfaces will be uniformly colored by the reduction of silver, lead and perhaps other readily reducible metallic constituents in the glass.

Although the colored surface layers generated in photochromic glasses by such treatments are quite thin, seldom exceeding 100 microns, the colors generated can be quite intense and, in some cases, can significantly attenuate the actinic ultraviolet radiation primarily responsible for photochromic darkening. This is particularly true in the case of colors which may be prescribed for certain eye disorders or conditions such as aphakia, photoretinitis, or retinitis pigmentosa. As noted in the aforementioned U.S. Pat. No. 4,284,686, selected colors can be generated which result in a virtual transmittance cutoff for all wavelengths below a selected wavelength in the 440–550 nm range.

Particularly in the case of heat treatments which develop such colors in the front surfaces of the semifinished cap blank, it is essential that the colored front surface layer be removed to restore effective photochromic response to the cap. Thus, the finishing of the cap front surface has as its objective not only the generation of a surface of optical quality on the cap, but also the removal of any surface tint developed during the reduction heat treatment.

It is also desirable that the cap not introduce refractive power into the final lens assembly, so that a selected prescription ground onto the lens base element will remain unaffected by the cap regardless of which particular cap is selected for use. For this reason, the curvature of the front surface of the cap should be adjusted during finishing to match the standard base curve previously generated on the back surface of the cap. At the same time, the thickness of the cap can be reduced to a value sufficient to provide a desirable degree of photochromic darkening but not so thick as to undesirably increase the weight of the final lens. Thicknesses in excess of about 1.5 mm are undesirable from the weight standpoint, and are seldom needed to improve photochromic response. Caps as thin as about 1.3 mm can be made on conventional grinding equipment without an undue incidence of breakage.

After the surfaces of the cap have been finished to optical quality, but before the cap is cemented into a final lens assembly, the cap may be subjected to a thermal or chemical strengthening process to meet U.S. FDA strength requirements. Strengthening is normally delayed until after the coloring heat treatment, since the latter can reduce lens strength if carried out subsequent to the strengthening process. Most conveniently, then, the strengthening of the cap, and also of the finished lens base elements is carried out just prior to the final cementing of the cap to the base.

The lens base element which is used for cementing to the cap is generally composed of an index-corrected white (untinted) ophthalmic crown glass of conventional composition. The front surface of the element will be finished to a standard spherical 6.18, 8.18 or 10.18 diopter curve, and the back surface will be ground and polished to the curvature required for a particular prescription, which may include corrective power, cylinder and/or prism, alone or in any combination. The base element can be finished to a relatively thin cross-section since it will be cemented to a cap element prior to use.

The cementing of the finished cap element to the base element can be accomplished using any permanent non-discoloring, transparent glass-bonding adhesive or cement. These use generally one- or two-part curing adhesives, based on epoxy, acrylic, polyurethane or silicone resins. The preferred cementing formulations are one-part ultraviolet-curing adhesives, sold particularly for optical use, which can be ultraviolet-curable acrylic, urethane-acrylic and polyurethane adhesives. Using such cements, it is easy to avoid gaseous and particulate inclusions between the cap and base, and to provide only a thin liquid layer which can be quickly and conveniently cured to a high-strength permanent bonding layer. The cemented assembly strongly resists delamination and can be mechanically edge-ground for the purpose of edging and framing without breakage.

A schematic illustration of the preparation of a colored prescription photochromic ophthalmic lens using a representative procedure according to the invention is illustrated in the drawing. Referring to the drawing, a blank for a cap element 10 is provided which is ground and polished to provide a finished back surface 11. The element is then fired or heat-treated in a reducing atmosphere (e.g., $H_2$) to develop colored surface layers 12 thereon, and the front surface 13 is ground and polished to remove the color and to achieve the desired curvature and thickness. A base element 14 with a prescription-ground back surface 15 is then provided and this element 14 is bonded to cap element 10 by cement layer 16 and edged to provide completed lens 20, wherein colored layer 12 is positioned interiorly of the completed lens.

The invention may be further understood by reference to the following detailed Example illustrating the manufacture of a colored photochromic ophthalmic lens in accordance therewith.

EXAMPLE

A lens blank composed of a photochromic glass, commercially available as Corning Code 8111 glass, is selected for use as a cap blank. This blank has a thickness of about 4 mm.

The back surface of the blank is finished to a concave curvature of 6.18 diopters by conventional grinding and polishing, and the semifinished blank is then subjected to a reduction heat treatment in a hydrogen atmosphere. The heat treatment comprises maintaining the blank at 495° C. in 100% $H_2$ gas for 18 hours.

At the conclusion of the heat treatment the semifinished blank is evaluated for color. It is found that the colored surface layers are orange in appearance and strongly attenuate blue light, transmitting almost no light at wavelengths below about 440 nm.

The colored semifinished cap blank thus provided is then subjected to further grinding and polishing to remove the coloring from the front surface of the blank and to reduce the thickness of the blank to about 1.5 mm. The curvature of the front surface is ground to 6.18 diopters, matching that of the back surface. The optical transmittance of the photochromic cap blank thus provided is about 72% in the undarkened state and 17% in the darkened state.

The finished photochromic cap is then subjected to an ion-exchange strengthening treatment wherein it is immersed in a molten $KNO_3$-$NaNO_3$ salt bath at a temperature of 385°–400° C. for about 20 hours to develop compressively stressed surface layers on the cap surfaces. The salt bath contains about 40% $NaNO_3$ and 60% $KNO_3$ by weight. This strengthening treatment is effective to increase the modulus of rupture stength of the cap to about 30,000 psi.

A blank for the lens base element is next selected. This blank is composed of a commercially available white crown ophthalmic glass, Corning Code 8361 glass, and has a thickness of about 4 mm.

The front (convex) surface of this blank is ground and polished to a curvature of 6.18 diopters, matching that of the back surface of the photochromic cap, and the back surface is ground to a curvature of about 7.18 diopters, so that the base element provides corrective power of about $-1.00$ diopters. The center thickness of the base element is reduced to about 0.75 mm during the grinding process.

The finished base element thus provided is then subjected to an ion-exchange strengthening treatment wherein it is immersed in a molten $KNO_3$-$NaNO_3$ salt bath, consisting of about 92% $KNO_3$ and 8% $NaNO_3$ by weight, at 460° C. for 16 hours to develop surface compression layers on the element. This strengthening treatment is effective to increase the modulus of rupture strength of the element to about 35,000 psi.

A thin layer of an ultraviolet-curing adhesive, commercially available as UV 74 TM adhesive from Summers Laboratory, Inc., Fort Washington, Pa., is next applied as a liquid to the front surface of the white crown base element. The photochromic cap is then placed over the coated base, and light pressure is applied to squeeze excess adhesive from the interlayer. The resulting assembly is then placed under an ultraviolet lamp for 30 minutes to cure the adhesive.

After the adhesive has been cured, the bonded lens is subjected to an edging process wherein the edges of the lens are ground into a configuration suitable for framing. The edging and framing operations can be carried out in conventional fashion without undue breakage atrributed to the laminated construction of the lens.

Lenses produced as above described routinely pass a ball drop safety test wherein a ⅝-inch diameter steel ball is dropped on the lens from a height of 50 inches.

To achieve reproducible strength results while at the same time achieving the minimum breakage in edging it is important that lenses fabricated from cap and base elements which have been pre-strengthened as above described have modulus of rupture strengths within a selected range of about 25,000 to about 40,000 psi. It is possible to develop much higher modulus of rupture strengths in these elements by optimized chemical strengthening treatments, e.g. up to about 70,000 psi in Code 8361 white crown glass, but the very high tensile stresses generated in the lens elements by such treatments can result in breakage during the edging process. Hence, a preferred process according to the invention includes chemically or thermally tempering the lens elements, subsequent to coloring and final finishing but prior to lamination, to strength values in the range of 25,000–40,000 psi.

As an alternative procedure, in order to fully minimize breakage on edging, the cap and base elements can be temporarily bonded for edging prior to chemical or thermal tempering operations. After the base and cap elements have been finished to final curvature and the cap has been colored by a suitable treatment, the cap and base are temporarily bonded together, for example, with a temporary pine tar or resin adhesive, and the bonded assembly is then edged for framing. The elements are then delaminated, for example, by treatment with a solvent for the resin, and each of the elements is subjected to a chemical or thermal strengthening treatment such as above described. Thereafter, the cap and base are permanently bonded together with a suitable adhesive to produce the final lens assembly.

In finishing the cap and base elements to the same nominal diopter curvature, it is important that the nominal diopter value should be maintained to within about ±0.05 diopters of the target value. In this way delamination and/or the entrapment of air bubbles at the cap/base intersection can be essentially entirely avoided.

The unique features of a colored prescription photochromic ophthalmic lens produced in accordance with the above description offer significant advantages over prior art tinted photochromic ophthalmic lenses, whether of the unitary or laminated type. The plano photochromic cap element, being of uniform thickness, completely avoids the "bulls-eye" or non-uniform center-to-edge darkening which can occur in high power prescription photochromic ophthalmic elements. The prescription-ground colorless base element, being non-absorbing, does not show absorption variations due to thickness variations, as do prescription ground elements which contain coloring agents, and the thin bonding layer, also being colorless, will not introduce color variations due to thickness variations caused by imperfect curvature matching between the cap and base elements.

The integral colored surface layers present on the photochromic cap element, being due to colorant species which are both inorganic and fully encapsulated within the glass matrix of the element, are completely stable against deterioration due to prolonged exposure to light or physical damage. Particularly advantageous is the avoidance of any plastic interlayer or film between the elements, other than the ultraviolet-cured adhesive, since such interlayers often present delamination problems.

I claim:

1. A process for providing a colored photochromic prescription ophthalmic lens which comprises the steps of:
    (a) providing a photochromic glass cap blank for a thin lens cap element to be provided with a convex front surface and a concave back surface;
    (b) finishing the back surface of the cap blank to a standard base curvature in the range of about 2 to 10 diopters to provide a semifinished cap blank with a concave back surface;
    (c) subjecting the semifinished cap blank to a heat treatment in a reducing atmosphere to cause the reduction of selected metallic constituents therein and the formation of an integral colored layer on the surfaces of the blank;
    (d) finishing the front surface of the cap blank to generate a front surface curvature matching the standard base curvature of the back surface, to remove front surface color, and to provide a finished cap element having a thickness not exceeding about 1.5 mm and having a convex front surface and a concave back surface;
    (e) providing a glass base element for the lens, said base element having a convex front surface with a standard base curvature matching that of the back surface of the finished cap element, and having a prescription-finished back surface imparting selected elements of power, cylinder, multifocal and prism correction to the base element; and
    (f) cementing the back surface of the colored cap element to the front surface of the base element such that the standard base curvatures mate, to provide a finished tinted prescription ophthalmic lens.

2. A process in accordance with claim 1 wherein, prior to cementing the cap element to the base element to provide the finished lens, each of the cap element and base element are thermally or chemically strengthened to a modulus of rupture strength of 25,000–40,000 psi.

3. A process in accordance with claim 2 wherein the cap and base elements are strengthened by immersion in a molten $KNO_3$-$NaNO_3$ salt bath.

4. A process in accordance with claim 2 wherein, prior to thermally or chemically strengthening the cap and base elements, the elements are temporarily joined into a bonded assembly, subjected to an edging step in preparation for framing, and then delaminated prior to strengthening.

* * * * *